United States Patent
Valdez et al.

(10) Patent No.: US 11,356,177 B1
(45) Date of Patent: Jun. 7, 2022

(54) SYSTEMS AND METHODS FOR MAPPING OPTICAL CONNECTIONS IN A FIBER DISTRIBUTION HUB OF A PASSIVE OPTICAL NETWORK

(71) Applicant: FRONTIER COMMUNICATIONS HOLDINGS, LLC, Norwalk, CT (US)

(72) Inventors: John Valdez, Copper Canyon, TX (US); Steven Smith, Keller, TX (US); Erwin Wardojo, McKinney, TX (US)

(73) Assignee: FRONTIER COMMUNICATIONS HOLDINGS, LLC, Norwalk, CT (US)

( * ) Notice: Subject to any disclaimer, the term of this patent is extended or adjusted under 35 U.S.C. 154(b) by 0 days.

(21) Appl. No.: 17/524,351

(22) Filed: Nov. 11, 2021

(51) Int. Cl.
| | |
|---|---|
| *H04B 10/07* | (2013.01) |
| *H04B 10/25* | (2013.01) |
| *G02B 6/26* | (2006.01) |
| *H04B 10/27* | (2013.01) |
| *H04N 7/18* | (2006.01) |

(52) U.S. Cl.
CPC ............. *H04B 10/25* (2013.01); *G02B 6/262* (2013.01); *H04B 10/07* (2013.01); *H04B 10/27* (2013.01); *H04N 7/18* (2013.01); *H04N 7/183* (2013.01)

(58) Field of Classification Search
None
See application file for complete search history.

(56) References Cited

U.S. PATENT DOCUMENTS

| | | | |
|---|---|---|---|
| 5,351,334 A | 9/1994 | Chun et al. | |
| 5,448,675 A * | 9/1995 | Leone | H04Q 1/155 439/507 |

(Continued)

FOREIGN PATENT DOCUMENTS

| | | |
|---|---|---|
| CA | 2951947 C | 1/2019 |
| CN | 104320726 A | 1/2015 |

(Continued)

OTHER PUBLICATIONS

Office Action in U.S. Appl. No. 17/524,361 dated Mar. 4, 2022, 9 pages.

(Continued)

*Primary Examiner* — Li Liu
(74) *Attorney, Agent, or Firm* — Marshall, Gerstein & Borun LLP

(57) ABSTRACT

Systems and methods for mapping optical connections in an FDH are disclosed. An example system includes an FDH and a computing device. The FDH includes a bulkhead having: a plurality of passive optical couplers each having a respective first port to receive a respective first optical fiber, a respective second port to receive a respective second optical fiber, and a respective passive optical activity indicator configured to expose first light propagating in the respective first optical fiber, and second light propagating in the respective second optical fiber; and an image sensor configured to capture one or more images of the plurality of passive optical activity indicators. The computing device configured to, based on the one or more images, determine which of the plurality of passive optical couplers are receiving a first optical signal at their respective first port and/or receiving a second optical signal at their respective second port.

17 Claims, 10 Drawing Sheets

(56) References Cited

U.S. PATENT DOCUMENTS

| | | | | |
|---|---|---|---|---|
| 6,256,445 | B1* | 7/2001 | Jennings | G02B 6/4452 385/135 |
| 6,437,894 | B1* | 8/2002 | Gilbert | G02B 6/3897 398/164 |
| 6,639,703 | B1 | 10/2003 | Egnell | |
| 7,255,488 | B1* | 8/2007 | Boone | G02B 6/3897 385/75 |
| 8,022,379 | B2 | 9/2011 | Davis | G02B 6/3584 250/551 |
| 8,649,684 | B2* | 2/2014 | Casterline | H04B 10/25756 398/115 |
| 9,094,842 | B2 | 7/2015 | Geile | |
| 9,547,142 | B1* | 1/2017 | Chen | G02B 6/4286 |
| 9,800,330 | B1* | 10/2017 | Yusuf | G02B 6/4215 |
| 9,958,622 | B1 | 5/2018 | Goergen et al. | |
| 10,146,021 | B2* | 12/2018 | Burgess | G02B 6/4452 |
| 10,374,746 | B1 | 8/2019 | Lawrence | |
| 10,454,584 | B1 | 10/2019 | Lee et al. | |
| 10,530,473 | B2* | 1/2020 | Huybrechts | H04B 10/07955 |
| 10,591,385 | B2* | 3/2020 | Perron | H04B 10/0731 |
| 10,732,368 | B1 | 8/2020 | Ray et al. | |
| 2005/0207000 | A1 | 9/2005 | Ooaku et al. | |
| 2006/0029389 | A1 | 2/2006 | Cleary et al. | |
| 2006/0110118 | A1 | 5/2006 | Escoto et al. | |
| 2007/0110099 | A1 | 5/2007 | Ozaki | |
| 2010/0316334 | A1* | 12/2010 | Kewitsch | G02B 6/3502 901/2 |
| 2011/0110662 | A1 | 5/2011 | Wellbrock et al. | |
| 2012/0063780 | A1 | 3/2012 | Greenberg et al. | |
| 2013/0034349 | A1 | 2/2013 | Neitge et al. | |
| 2015/0093091 | A1* | 4/2015 | Reagan | G02B 6/3849 385/135 |
| 2015/0309276 | A1* | 10/2015 | Collart | G02B 6/4457 385/135 |
| 2015/0355428 | A1 | 12/2015 | Leeman et al. | |
| 2016/0344590 | A1 | 11/2016 | Huey et al. | |
| 2017/0103861 | A1 | 4/2017 | Reid | |
| 2017/0139165 | A1* | 5/2017 | Burgess | G02B 6/3895 |
| 2017/0322384 | A1* | 11/2017 | Burkett | G02B 6/4453 |
| 2018/0248644 | A1* | 8/2018 | Gronvall | H04B 10/25758 |
| 2018/0266918 | A1* | 9/2018 | Schell | G01M 11/35 |
| 2019/0052357 | A1* | 2/2019 | Huybrechts | G02B 6/4291 |
| 2019/0170610 | A1* | 6/2019 | Perron | H04B 10/0731 |
| 2019/0331871 | A1 | 10/2019 | Van Baelen et al. | |
| 2020/0124498 | A1 | 4/2020 | Leclerc et al. | |
| 2021/0250096 | A1 | 8/2021 | Zhou et al. | |

FOREIGN PATENT DOCUMENTS

| | | | |
|---|---|---|---|
| EP | 1519616 A2 | 3/2005 | |
| KR | 20210076120 A | 6/2021 | |
| WO | WO-2016/187257 A1 | 11/2016 | |
| WO | WO 2018/113387 | * 6/2018 | ............ H04B 10/25 |
| WO | WO-2018/113387 A1 | 6/2018 | |
| WO | WO-2019/143510 A1 | 7/2019 | |

OTHER PUBLICATIONS

Office Action in U.S. Appl. No. 17/524,365 dated Apr. 5, 2022, 12 pages.

Office Action in U.S. Appl. No. 17/524,351 dated Apr. 14, 2022, 28 pages.

\* cited by examiner

SYSTEMS AND METHODS FOR MAPPING OPTICAL CONNECTIONS IN A FIBER DISTRIBUTION HUB OF A PASSIVE OPTICAL NETWORK

FIELD OF THE DISCLOSURE

This disclosure relates generally to passive optical networks, and, more particularly, to systems and methods for mapping optical connections in a fiber distribution hub of a passive optical network.

BACKGROUND

A conventional passive optical network (PON) includes one or more optical line terminals (OLTs) at a central location connecting to one or more optical network terminals (ONTs) at respective customer premises. A PON is typically implemented using a point-to-multipoint topology in which a feeder optical fiber from an OLT serves multiple ONTs via respective distribution optical fibers. Typically, the feeder optical fiber is optically coupled to distribution optical fibers for respective ones of the ONTs in a fiber distribution hub (FDH) using an optical splitter and a bulkhead having a plurality of optical couplers. Over time, as distribution optical fibers are connected, disconnected, reconnected via different ports, etc. to a bulkhead, it may become increasingly difficult for a service technician to know which ports of a bulkhead are active, connected, provisioned, available for use, etc. Today, a service technician must disconnect, unplug, etc. an optical fiber and connect it to a light meter to determine whether the optical fiber is carrying an optical signal. Such a process may be time-consuming and may reduce technician efficiencies. Further, service technicians may erroneously attempt to repair a service by placing the optical fiber of a customer experiencing service disruptions into a working optical coupler, which was unknowingly providing service to a different customer. This may result in service disruptions.

Accordingly, there is a need for passive optical couplers that can provide an indication of the status of their ports. Moreover, there is a need for systems and methods for collecting information regarding optical connections in a PON. Furthermore, there is a need for systems and methods for mapping optical connections in a PON.

SUMMARY

In an example, a system includes a fiber distribution hub (FDH) of a passive optical network (PON), and a computing device. The FDH including a bulkhead having a plurality of passive optical couplers, each of the plurality of passive optical couplers having: a respective first port adapted to receive an end of a respective first optical fiber, a respective second port adapted to receive an end of a respective second optical fiber, and a respective passive optical activity indicator configured to expose (i) a portion of first light propagating in the respective first optical fiber when the first optical fiber is received in the first port, and (ii) a portion of second light propagating in the respective second optical fiber when the second optical fiber is received in the second port. The FDH further including an image sensor configured to capture one or more images of the respective passive optical activity indicators of the plurality of passive optical couplers. The computing device configured to, based on the one or more images, determine which of the plurality of passive optical couplers are receiving a first optical signal at their respective first port and/or receiving a second optical signal at their respective second port In another example, a method includes accessing one or more digital images of a bulkhead of a fiber distribution hub (FDH) of a passive optical network (PON), the one or more images depicting a plurality of passive optical activity indicators of respective ones of a plurality of passive optical couplers of the bulkhead, each of the plurality of passive optical couplers having a respective first port adapted to receive an end of a respective first optical fiber, a respective second port adapted to receive an end of a respective second optical fiber, and a respective passive optical activity indicator constructed of a passive light transmissive material that passively exposes (i) a portion of first light propagating in the respective first optical fiber when the first optical fiber is received at the first port, and (ii) a portion of second light propagating in the respective second optical fiber when the second optical fiber is received at the second port; and determining, based upon the one or more images, which of the plurality of passive optical couplers are receiving a first optical signal at their respective first port and/or receiving a second optical signal at their respective second port.

In yet another example, a non-transitory, computer-readable storage medium stores instructions that, when executed by one or more processors, cause a system to: access one or more images of a bulkhead of a fiber distribution hub (FDH) of a passive optical network (PON), the one or more images depicting a plurality of passive optical activity indicators of respective ones of a plurality of passive optical couplers of the bulkhead, each of the plurality of passive optical couplers having a respective first port adapted to receive an end of a respective first optical fiber, a respective second port adapted to receive an end of a respective second optical fiber, and a respective passive optical activity indicator constructed of a passive light transmissive material that passively exposes (i) a portion of first light propagating in the respective first optical fiber when the first optical fiber is received at the first port, and (ii) a portion of second light propagating in the respective second optical fiber when the second optical fiber is received at the second port; and determine, based upon the one or more images, which of the plurality of passive optical couplers are receiving a first optical signal at their respective first port and/or receiving a second optical signal at their respective second port.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate examples of concepts that include the claimed invention, and explain various principles and advantages of those examples.

Figure 1:
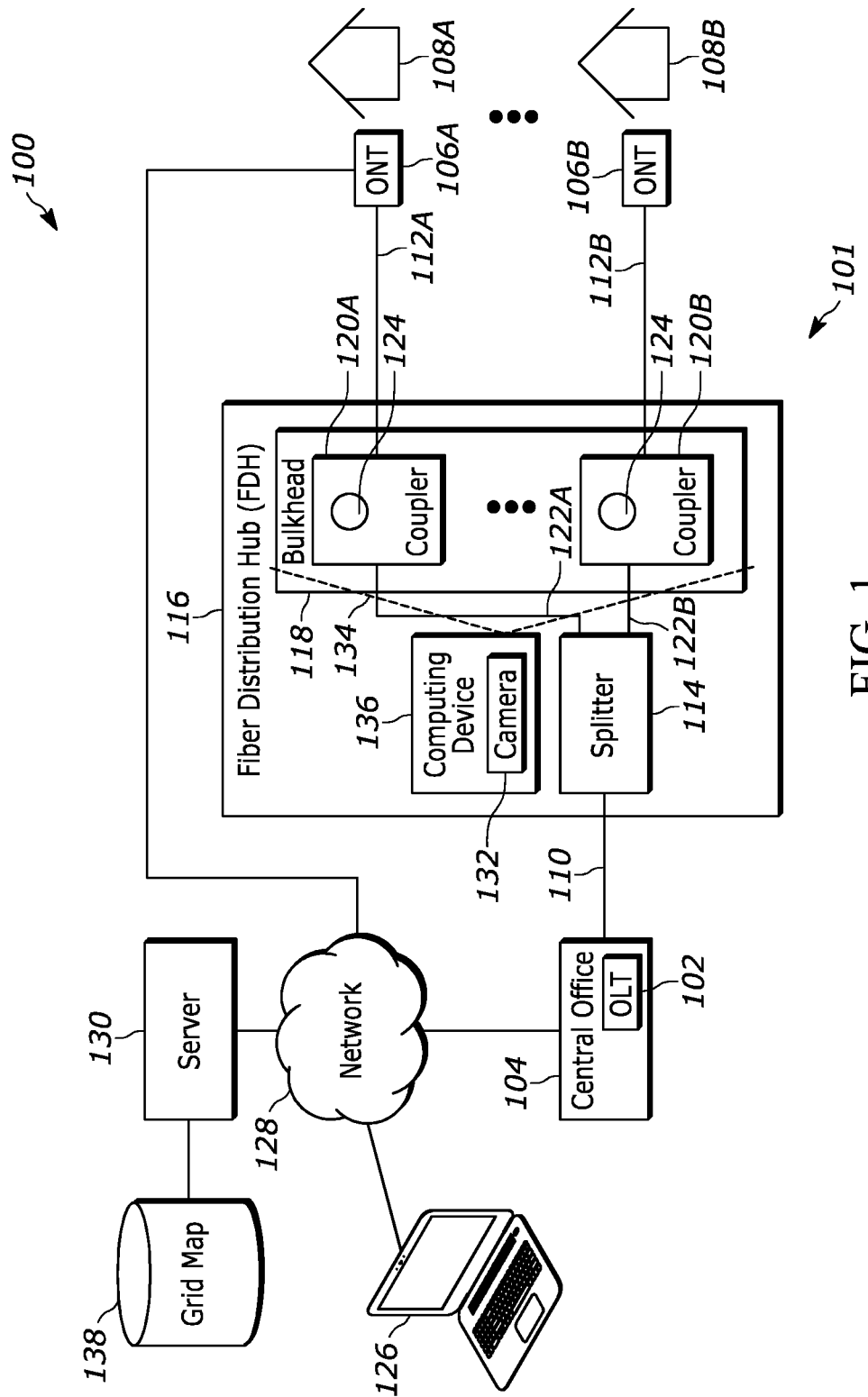
FIG. 1 is a schematic diagram of an example system having an example passive optical network (PON) constructed in accordance with the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of the present disclosure.

The apparatus and method components have been represented where appropriate by conventional symbols in the drawings, showing only those specific details that are pertinent to understanding examples of the present disclosure so as not to obscure the disclosure with details that will be readily apparent to those of ordinary skill in the art having the benefit of the description herein.

Although the figures show parts with clean lines and boundaries, some or all of these lines and/or boundaries may be idealized. In reality, the boundaries and/or lines may be unobservable, blended, and/or irregular. Use of terms such as up, down, top, bottom, side, end, front, back, etc. herein are used with reference to a currently considered or illustrated orientation. If they are considered with respect to another orientation, it should be understood that such terms must be correspondingly modified.

DETAILED DESCRIPTION

Disclosed examples of the disclosure provide a number of advantages over existing passive optical networks (PONs) that do not include the example passive optical couplers disclosed herein. For example, because active ports can be detected with disclosed examples, the occurrence of inadvertent disconnections of an active and currently working service can be reduced. Such inadvertent disconnections can result in a service call, which can cost a network provider hundreds of dollars. Moreover, by reducing inadvertent disconnections, customer satisfaction can be increased, at least because the customer isn't asked to factory reset their modem in an unfruitful and unnecessary attempt to restore service before initiating a service call. Such factory resets are frustrating to customers as they may require the customer to reconfigure their modem (e.g., the setup a WiFi network). Furthermore, the resources of a fiber distribution hub (FDH) can be conserved by, for example, allowing passive optical couplers that are not currently being used but are still connected to an unused distribution optical fiber to be identified and reassigned. Still further, the labor costs associated with provisioning and/or repairing a service to a customer can be reduced by the automatic ability to detect an active passive optical coupler for use in provisioning or repairing the service. Such problems may be exacerbated overtime by the inevitable development of a "rats nest" of cabling in an FDH due to numerous connections, re-connections, disconnections, etc. of optical fibers to passive optical couplers. Such conditions may make it extremely difficult to identify what is connected to what, what is active, what is inactive or unused, etc.

While examples of the disclosure are directed to using example passive optical activity indicators of example passive optical couplers of a fiber distribution hub (FDH) in a passive optical network (PON) to map optical connections of the FDH, persons of ordinary skill in the art will recognize that the disclosure may be used to map connections in other systems and/or network. For example, images of active port indicators may be taken and processed to determine a map of connections in active networks and/or systems. For example, images of a plurality of link activity indicators of an Ethernet switch/hub may be captured and processed to detect and map active/connected ports. For instance, activity of Ethernet devices may be controlled (e.g., by controlling a pattern of sending packets on a port), and images of an Ethernet switch may be used to identify which Ethernet devices are connected to which ports.

Reference will now be made in detail to non-limiting examples, some of which are illustrated in the accompanying drawings.

Example Passive Optical Network (PON)

FIG. 1 is a schematic diagram of an example system 100 including an example PON 101 constructed in accordance with the disclosure. The example PON 101 includes one or more optical line terminals (OLTs) (one of which is designated at reference numeral 102) at a central location (e.g., at a central office 104) connecting to one or more optical network terminals (ONTs) (two of which are designated at reference numerals 106A and 106B) at respective customer premises (two of which are designated at reference numerals 108A and 108B). The ONTs 106A, 106B may be located outside and/or inside the customer premises 108A, 108B. In some examples herein, an optical terminal refers to an OLT or an ONT.

The example PON 101 is implemented using a point-to-multipoint topology in which a feeder optical fiber 110 from the OLT 102 (sometimes called an F1 optical fiber) serves the one or more ONTs 106A, 106B via respective distribution optical fibers 112A, 112B (sometimes called F2 optical fibers). While in the illustrated example, there is one feeder optical fiber 110 feeding the distribution optical fibers 112A, 112B via a single optical splitter 114, the PON 101 may include additional feeder optical fibers and optical splitters for a plurality of additional customer premises. Moreover, a PON may include a plurality of FDHs.

In the illustrated example, the feeder optical fiber 110 is optically coupled to the plurality ONTs 106A, 106B via an example 1-to-many optical splitter 114 disposed, located, implemented, etc. in an example FDH 116. In some examples, the FDH 116 is located within a geographic area (e.g., a neighborhood) such that the customer premises 108A, 108B are close to the FDH 116.

There may be multiple points along these paths where one optical fiber is connected to another optical fiber. For example, to provide for dynamic (e.g., changeable) connections, the example FDH 116 includes a distribution means having a plurality of coupling means for coupling optical fibers. In this example, this distribution means is a bulkhead 118 of the FDH 116, and the couplings means are implemented by passive optical couplers (two of which are designated at reference numerals 120A and 120B) of the bulkhead 118, but other structures are likewise appropriate. In the illustrated example, a plurality of optical fibers (two of which are designated at reference numerals 122A and 1228) from the optical splitter 114 are typically connected to respective first ports of the passive optical couplers 120A, 1208. In some examples, the optical fibers 122A, 1228 are connected to the first ports of the passive optical couplers 120A, 1208 on a backside of the bulkhead 118, when looking into the FDH 116 from the front. The distribution optical fibers 112A, 1128 are connected to respective second ports of the passive optical couplers 120A, 1028. In some examples, the distribution optical fibers 112A, 1128 are connected to the second ports of the passive optical couplers 120A, 1208 on a front side of the bulkhead 118, when looking into the FDH 116 from the front. While in the illustrated example, there is a single bulkhead 118, an FDH may have any number of bulkheads. Moreover, a bulkhead may provide for connecting optical fibers associated with more than one optical splitter.

In the illustrated example of FIG. 1, the passive optical couplers 120A, 1206 are passive devices. That is, the example passive optical couplers 120A, 1206 do not need, require, utilize, generate and/or otherwise use any form of electrical power. Instead, as will be discussed below, the passive optical couplers 120A, 1206 include only passive components.

Over time, as distribution optical fibers 112A, 1126 are connected to the bulkhead 118 (e.g., to provision a service to an ONT, to reconnect an ONT to a different coupler, etc.) and/or disconnected (e.g., to de-provision a service to an ONT, troubleshoot a service to an ONT, etc.), it may become increasingly difficult for a service technician working at the FDH 116 to know, determine, identify, detect, etc. which ports of the bulkhead 118 are active, connected, provisioned, available for use, etc. In some instances, grid maps for an FDH are managed manually and, thus, are often inaccurate and/or incomplete. Today, a service technician must disconnect, unplug, etc. an optical fiber and connect it to a light meter to determine whether the optical fiber is carrying an optical signal.

To provide one or more indications regarding the status of its ports, the example passive optical couplers 120A, 1206 each include an indicating means for indicating port status. In this example, the indicating means is implemented by an example passive optical activity indicator 124, but other structures are likewise appropriate. The example passive optical activity indicators 124 passively and externally expose a portion of the light propagating in one or both optical fibers connected to a respective passive optical coupler 120A, 1206. Thus, light exposed by a passive optical activity indicator 124 can be externally detected (e.g., visually, using a light meter, using a sensor, using an image sensor, etc.), and used to determine whether an optical fiber connected to a passive optical coupler 120A, 1206 is actually carrying a propagating optical signal.

An example passive optical coupler 200 that may be used to implement the example passive optical couplers 120A, 1206 are described below in connection with FIGS. 2A-2F.

Mapping of Optical Connections

In some examples, an optical terminal (e.g., the OLT 102 and/or the ONTs 106A, 106B) includes a light transmitting means for selectively multiplexing, injecting, transmitting, etc. indication light into an optical fiber according to a particular pattern. In this example, the light transmitting means is implemented by a light source to transmit light according to a pattern, and/or an optical multiplexer (e.g., see FIG. 3), but other structures are likewise appropriate. When the pattern with which an optical terminal transmits indication light is unique to the optical terminal, then light exposed by the passive optical indicator 124 can be used to uniquely identify an optical terminal connected (e.g., optically coupled) to a passive optical coupler 120A, 1208. Moreover, when two optical terminals are connected via a passive optical coupler 120A, 1208 and each transmit indication light according to a respective unique pattern, then light exposed by the passive optical indicator 124 can be used to identify whether neither, one, or both of the optical terminals are actually connected (e.g., optically coupled) to the passive optical coupler 120A, 120B. In some examples, an optical terminal selectively transmits indication light into an optical fiber in response to a received control signal.

In some examples, the indication light transmitted into an optical fiber is in addition to or instead of other light propagating in the optical fiber associated with providing a service to an ONT. The indication light may be transmitted by multiplexing first light having a first wavelength associated with providing the communication service with second light having a different second wavelength associated with providing an activity indication. Light exposed by the passive optical indicator 124 associated with the second wavelength may be used to determine and/or identify whether an optical terminal is coupled to a passive optical coupler 120A, 1208. In some examples, a device (e.g., an image sensor) used to detect light emitted by a passive optical activity indicator 124 is tuned, adjusted, configured, etc. to detect light having the second wavelength and to block light having the first wavelength.

In some examples, the indication light transmitted into an optical fiber is at a wavelength visible to a person and blinks at a rate that can be perceived by the person such that the person can visually look at a passive optical activity indicator 124 and determine whether a passive optical coupler 120A, 1208 is connected to a particular optical terminal. In some examples, indication light is simultaneously transmitted into an optical fiber by two different optical terminals using a wavelength visible to a person and with intertwined blink patterns such that a person can determine that both optical terminals are connected to a passive optical coupler 120A, 1208 when the light exposed by a passive optical activity indicator 124 is substantially steady. In such examples, when the passive optical activity indicator 124 blinks, the person can visually determine that only one of the optical terminals is connected to the passive optical coupler 120A, 1208. Moreover, if the optical terminals blink their indication light at different rates (e.g., one slow and one fast), then the rate of blinking may be visually detected by the person and used to identify which optical terminal is connected to the passive optical coupler 120A, 120B.

In some examples, the pattern by which indication light is transmitted into an optical fiber is based on a unique identifier (e.g., a device identifier, a serial number, a MAC address, etc.). That is, the transmitted indication light can convey an encoded identifier. For example, whether indication light is active or inactive during each of a plurality of time periods can be determined based on the value of a respective bit of an encoded identifier. In such examples, the encoded identifier may include a preamble that can be used to identify, detect, etc. the start of an encoded identifier in transmitted indication light.

In some examples, an optical terminal (e.g., the OLT 102 and/or the ONTs 106A, 106B) transmits indication light into an optical fiber in response to control signals received from a computing device. For example, control signals may be received from a computing device 126 (e.g., a laptop, a computer, a tablet, a mobile phone, etc.) associated with a service technician. In some examples, the device 126 controls an optical terminal via the PON 101, via a network 128 such as the Internet or a private network, and/or by direct interaction with the optical terminal (e.g., via a hotspot provided by the optical terminal, a service port of the optical terminal, etc.). Additionally and/or alternatively, control signals may be received from a server 130 that is used to manage the PON 101 via the PON 101, the network 128, etc.

To collect, obtain, etc. information representing optical connections of the FDH 116, the example FDH 116 includes an imaging means for capturing images of the bulkhead 118. In this example, the imaging means is implemented by one or more image sensors, imaging devices, cameras, etc. 132, but other structures are likewise appropriate. The image sensor 132 captures images of the passive optical activity indicators 124 of the bulkhead 118 falling within a field of view 134 of the image sensor 132. As discussed below in connection with FIG. 4, the image sensor 132 may be mounted on a door of the FDH 116 such that the image sensor 132 is opposite the bulkhead 118 when the door is closed. In such examples, the image sensor 132 may be close to the bulkhead 118 when the door is closed. Accordingly, more than one image sensor 132 may be required to capture images of all of the passive optical activity indicators 124 of the bulkhead 118. In some examples, the image sensor(s) 132 are configured to capture images a frame rate that exceeds (e.g., at least twice) the rate at which light sources change their transmitted indication light. As discussed below in connection with FIG. 9, the image sensor(s) 132 may be associated with a computing device 136 that includes, among other things, a processing means for controlling the image sensor(s) 132, a storage means for storing images captured by the image sensor(s) 132, and a communicating means for communicating, providing, etc. stored image to another computing device (e.g., the computing devices 126, 130). When indication light is transmitted into an optical fiber by multiplexing first light having a first wavelength associated with providing a communication service with second light having a different second wavelength associated with providing an activity indication, the image sensor (s) 132 may be configured to sense light at the second wavelength and to filter out light at the first wavelength To map optical connections of the FDH 116, the example system 100 includes a computing means for processing image data of the images captured of the bulkhead 118 for determining which of the plurality of passive optical couplers 120A, 120B are receiving optical signals on one or more of their ports. In this example, the computing means is a processor platform such as the server 130, but other structures are likewise appropriate. As will be described in more detail below in connection with the flowchart 800 of FIG. 8, the server 130 may configure one or more optical terminals (e.g., the OLT 102 and/or the ONTs 106A, 106B) of the PON 101 to transmit indication light into respective optical fibers, control the FDH 116 (e.g., the image sensor(s) 132 via the computing device 136) to capture one or more images of the bulkhead 118 of the FDH 116, and process image data for the images to determine which passive optical activity indicators 124 are emitting light and the pattern(s) of emitted light. Based on these, or other, determinations, the server 130 may identify which passive optical couplers 120A, 120B are connected to which optical terminals. In some examples, the server 130 uses the identifications to fill in one or more entries of an electronic grid map 138 of the FDH 116 that represents the connections of particular optical terminals to particular ports of particular passive optical couplers 120A, 120B.

The example electronic grid map 138 may be a table that contains a plurality of rows for respective ones of the passive optical couplers 120A, 120B, with each row including, possibly among other entries, an entry to identify the passive optical coupler 120A, 120B (e.g., coordinates of the location of the passive optical coupler 120A, 120B on the bulkhead 118), an entry to indicate whether and/or which feeder optical fiber 110 is connected to the passive optical coupler 120A, 120B, and an entry to indicate whether and/or which distribution optical fiber 112A, 112B is connected to the passive optical coupler 120A, 120B. In some examples, the electronic grid map 138 is accessible by a service technician via a user interface provided by either or both of the computing devices 126, 130. The electronic grip map 138 may be stored on any storage means. In this example, the storage means in any number and/or type(s) of computer-readable storage medium, disk or device, such as memory 904 and/or database 910 of FIG. 9, but other structures are likewise appropriate.

Example Passive Optical Coupler

Figure 2A:
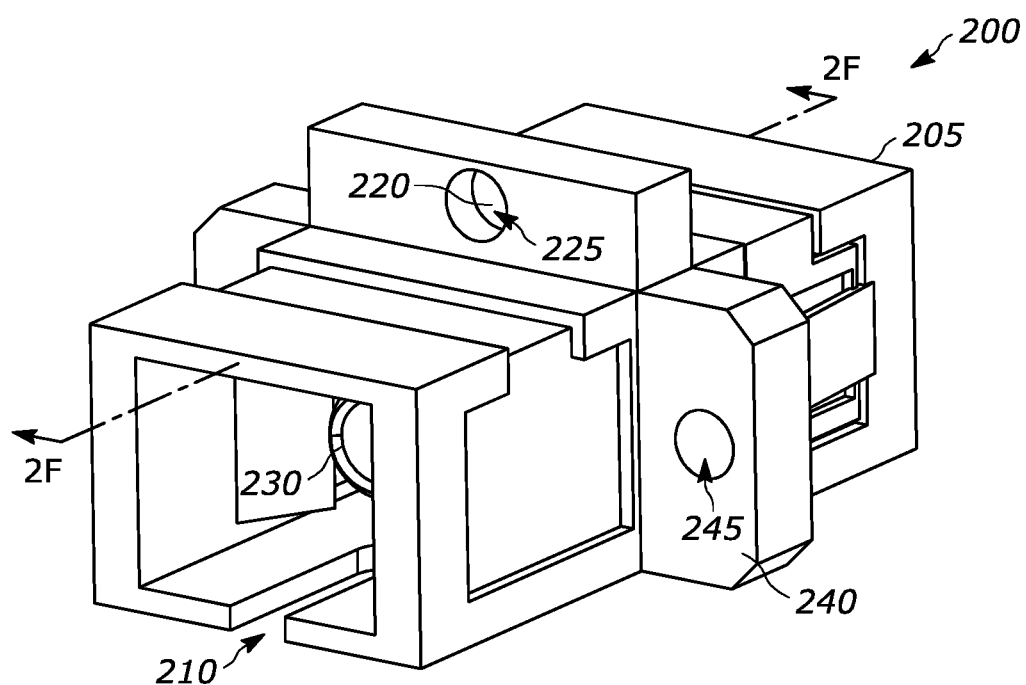
FIG. 2A is a perspective view of an example passive optical coupler that may be used to implement the example passive optical couplers of FIG. 1, in accordance with the disclosure.
Figure 2B:
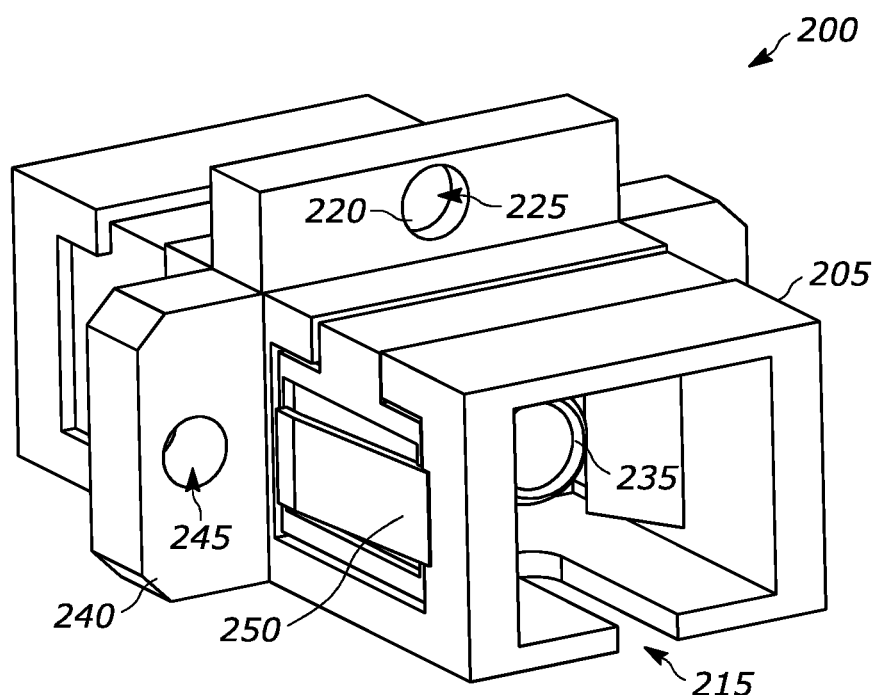
FIG. 2B is another perspective view of the example passive optical coupler of FIG. 2A, in accordance with the disclosure.
Figure 2C:
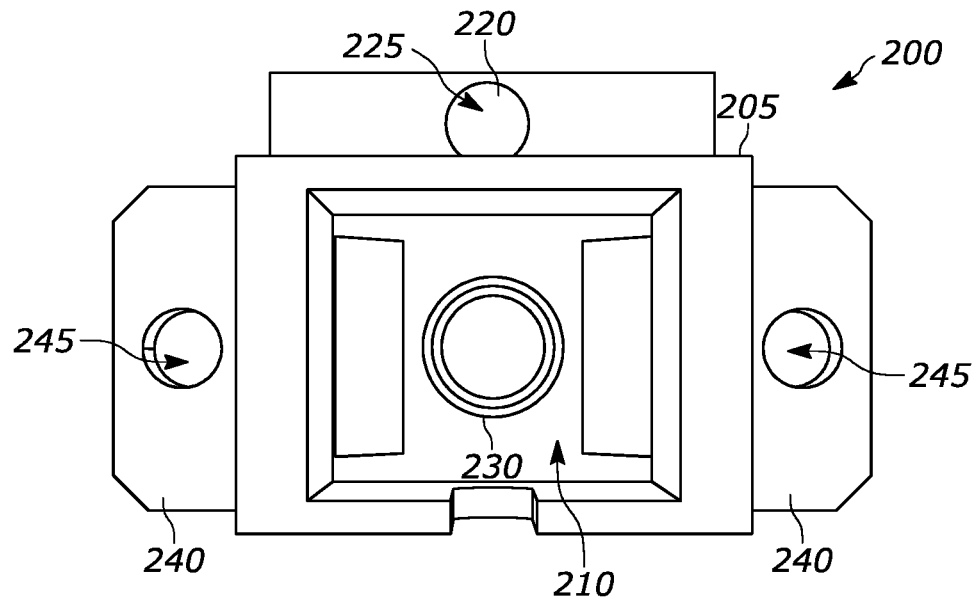
FIG. 2C is an end view of a first end the example passive optical coupler of FIG. 2A, in accordance with the disclosure.
Figure 2D:
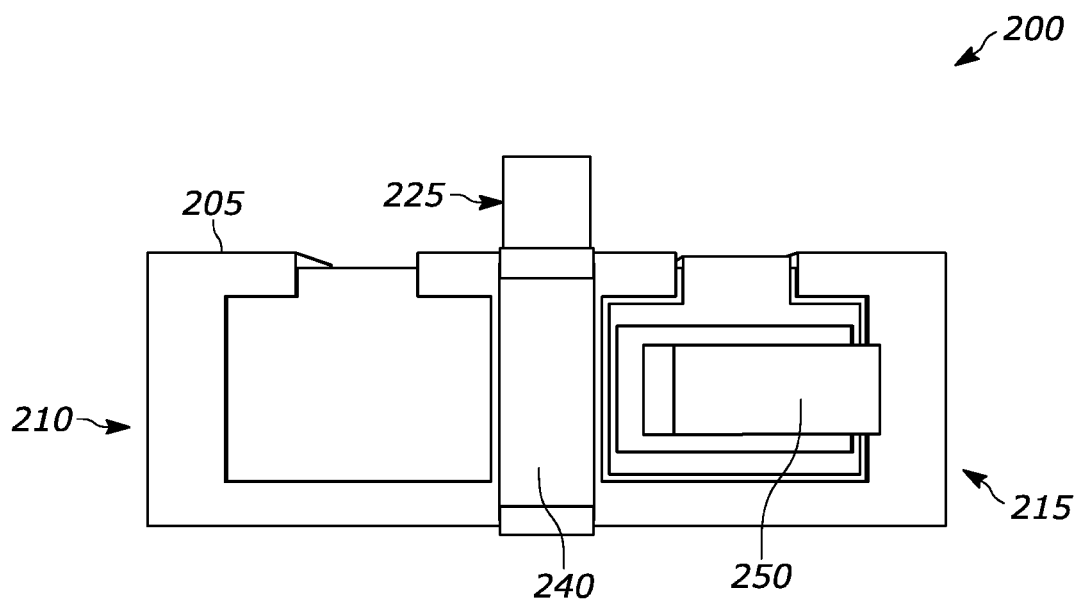
FIG. 2D is a side view of the example passive optical coupler of FIG. 2A, in accordance with the disclosure.
Figure 2E:
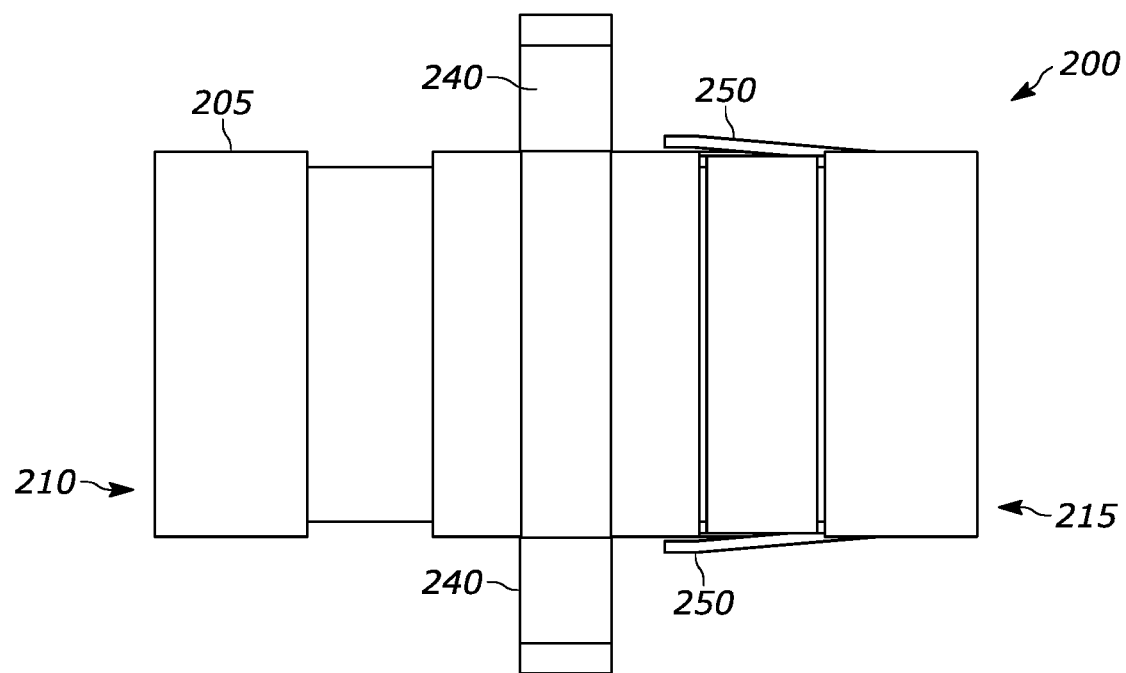
FIG. 2E is a top view of the example passive optical coupler of FIG. 2A, in accordance with the disclosure.
Figure 2F:
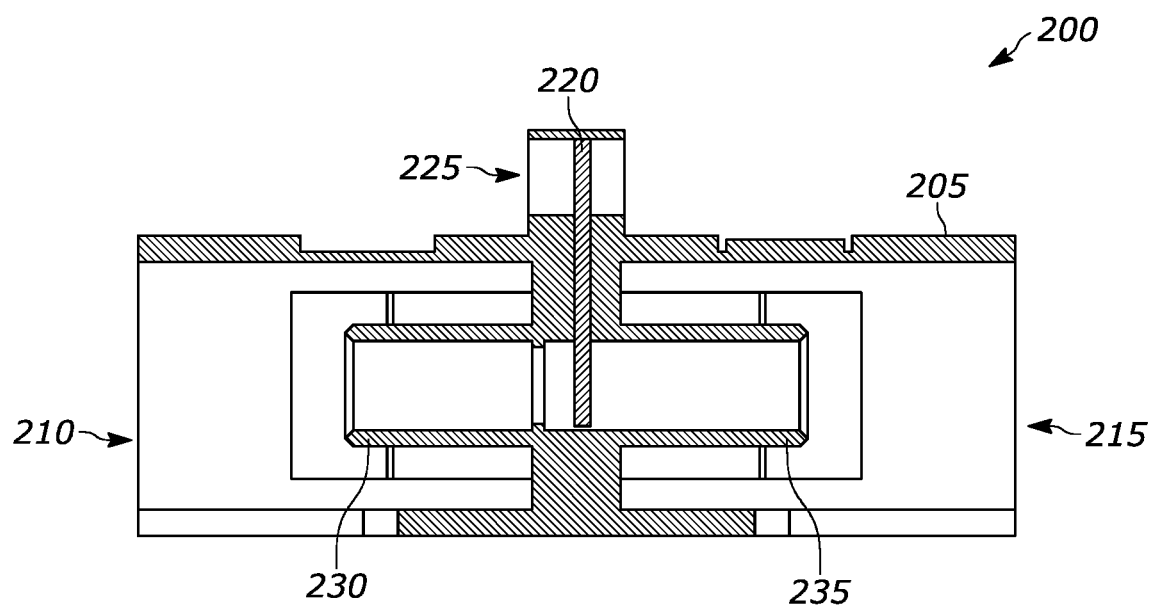
FIG. 2F is a side cross-section view of the example passive optical coupler of FIG. 2A, in accordance with the disclosure.

FIG. 2A is a perspective view of an example passive optical coupler 200 that may be used to implement the example passive optical couplers 120A, 120B of FIG. 1, in accordance with the disclosure. FIG. 2B is another perspective view of the example passive optical coupler 200. FIG. 2C is an end view of an end the example passive optical coupler 200. FIG. 2D is a side view of the example passive optical coupler 200. FIG. 2E is a top view of the example passive optical coupler 200. FIG. 2F is a side cross-section view of the example passive optical coupler 200 taken along line 2F-2F of FIG. 2A.

The example passive optical coupler 200 of FIGS. 2A-2F includes a housing 205 in which two receiving means are defined on opposite ends of the housing 205. In this example, the receiving means are ports, openings, receptacles, female connectors, etc. 210 and 215 defined in the housing 205 and configured, adapted, etc. for receiving and securing connectors at ends of respective optical fibers, but other structures are likewise appropriate. In some examples, the ports 210, 215 are configured to receive SC fiber optic connectors.

In the illustrated example, the optical fibers, when their respective connectors are received in the ports 210, 215, are optical coupled by an indicating means. In this example, the indicating means is a pane 220 of passive optical material disposed at least partially within the housing 205 and generally in the middle of the housing 205 between the ports 210, 215, but other structures are likewise appropriate. The pane 220 may be used to implement the example passive optical activity indicators 124 of FIG. 1. When connectors of the optical fibers are received in respective ports 210, 215, ends of the optical fibers come into optical contact with respective sides, surfaces or planes of the pane 220, and become optically coupled thereby.

At least a portion of light propagating in one or both of the optical fibers will propagate between the optical fibers via the pane 220. An additional portion of light propagating in one or both of the optical fibers will propagate through and/or within the pane 220 and be emitted out of the optical coupler 200 through an opening 225 defined in the housing 205. In some examples, only one decibel (1 dB) of optical loss is introduced between the optical fibers by the example pane 220. In some examples, the pane 220 includes an angled surface (not shown) to direct light in the pane 220 through the opening 225. An example angle is 45 degrees.

In the illustrated example, the ports 210, 215 of the passive optical coupler 200 may have a respective ferrule 230, 235 to position and secure optical ends of the optical fibers within the passive optical coupler 200 relative to the pane 220 to provide a stable optical coupling.

As shown, the passive optical coupler 200 may include mounting means for securing the passive optical coupler 200 to a bulkhead (e.g., the bulkhead 118). In this example, the mounting means includes one or more tabs 240 with mounting holes 245, and/or one or more spring tabs 250, but other structures are likewise appropriate. In the illustrated example, the passive optical coupler 200 is configured to be mounted front-to-back to the face of a bulkhead with the opening 225 and pane 220 exposed frontward from the bulkhead. The port 215 may face backwards from the face of the bulkhead to receive an optical fiber from a splitter (e.g., the splitter 114), and the port 210 may face forward from the face of the bulkhead to receive a distribution optical fiber (e.g., one of the distribution optical fibers 112A, 112B). In some examples, the passive optical coupler 200 may be secured to the face of the bulkhead with screws, bolts, etc. through the openings 245 in the tabs 240 into or through the face of the bulkhead. Additionally and/or alternatively, the spring tabs 250 may be used to secure the face of the bulkhead between the spring tabs 250 and the tabs 240.

While an example method of exposing a portion of a passive optical activity indicator (e.g., the pane 220) is illustrated in FIGS. 2A-2F, persons of ordinary skill in the art will recognize that other methods of exposing a portion of a passive optical activity indicator may be used. For example, an edge or end of the pane 220 may be exposed through the housing 205, an end of the pane 220 may extend through and beyond a surface of the housing 205, etc.

Example Optical Terminal

Figure 3:
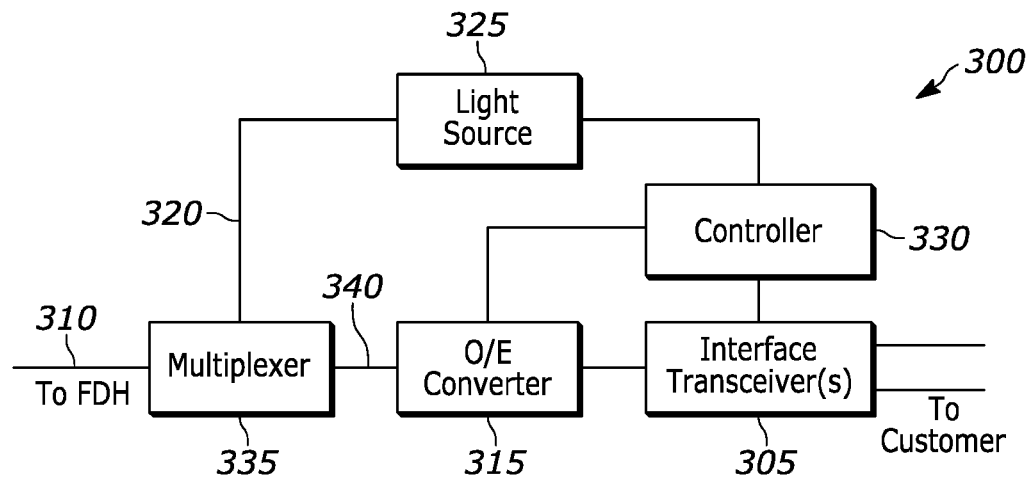
FIG. 3 is a schematic diagram of an example optical terminal that may be used to implement the example optical line terminal and/or optical network terminals of FIG. 1, in accordance with the disclosure.

FIG. 3 is a schematic diagram of an example optical terminal 300 that may be used to implement at least a portion of the example OLT 102 and/or the example ONTs 106A, 106B. To send data to and/or receive data from a customer's equipment, the example optical terminal 300 includes any number and/or type(s) interface transceivers 305. Example interface transceivers 305 include an Ethernet transceiver, a WiFi transceiver, a telephone service interface, etc.

To convert between optical signals propagating on an optical fiber 310 and digital signals for and/or from the interface transceiver(s) 305, the example optical terminal 300 includes any type of optical-to-electrical (O/E) converter 315.

To generate indication light 320 for detection at a passive optical activity indicator, the example optical terminal 300 includes an example light source 325. The example light source 325 selectively generates the indication light 320 responsive to control signals from a controller 330. The light source 325 may be configured to generate indication light 320 according to a prescribed pattern. Example patterns include, as described above, a blinking rate and duty cycle, an encoding with a unique identifier, etc. In some examples, a wavelength associated with the indication light 320 is selected to be different from a wavelength associated with providing a service via the O/E converter 315 and the interface transceiver(s) 305.

Control of the light source 325 by the controller 330 may be responsive to control signals received from another device such as a laptop, a computer, a mobile phone, etc. associated with a service technician (e.g., the computing device 126), a server used to manage a PON (e.g., the server 130), etc. The signals may be received, for example, via a PON (e.g., via the optical fiber 310), via a network such as the Internet or a private network, via direct interaction with the optical terminal (e.g., via a hotspot provided by the optical terminal, a service port of the optical terminal, etc.), etc.

An example optical multiplexer 335 multiplexes the indication light 320 onto to the optical fiber 310 together with service light 340 associated with providing a service via the O/E converter 315 and the interface transceiver(s) 305.

Example Fiber Distribution Hub (FDH)

Figure 4:
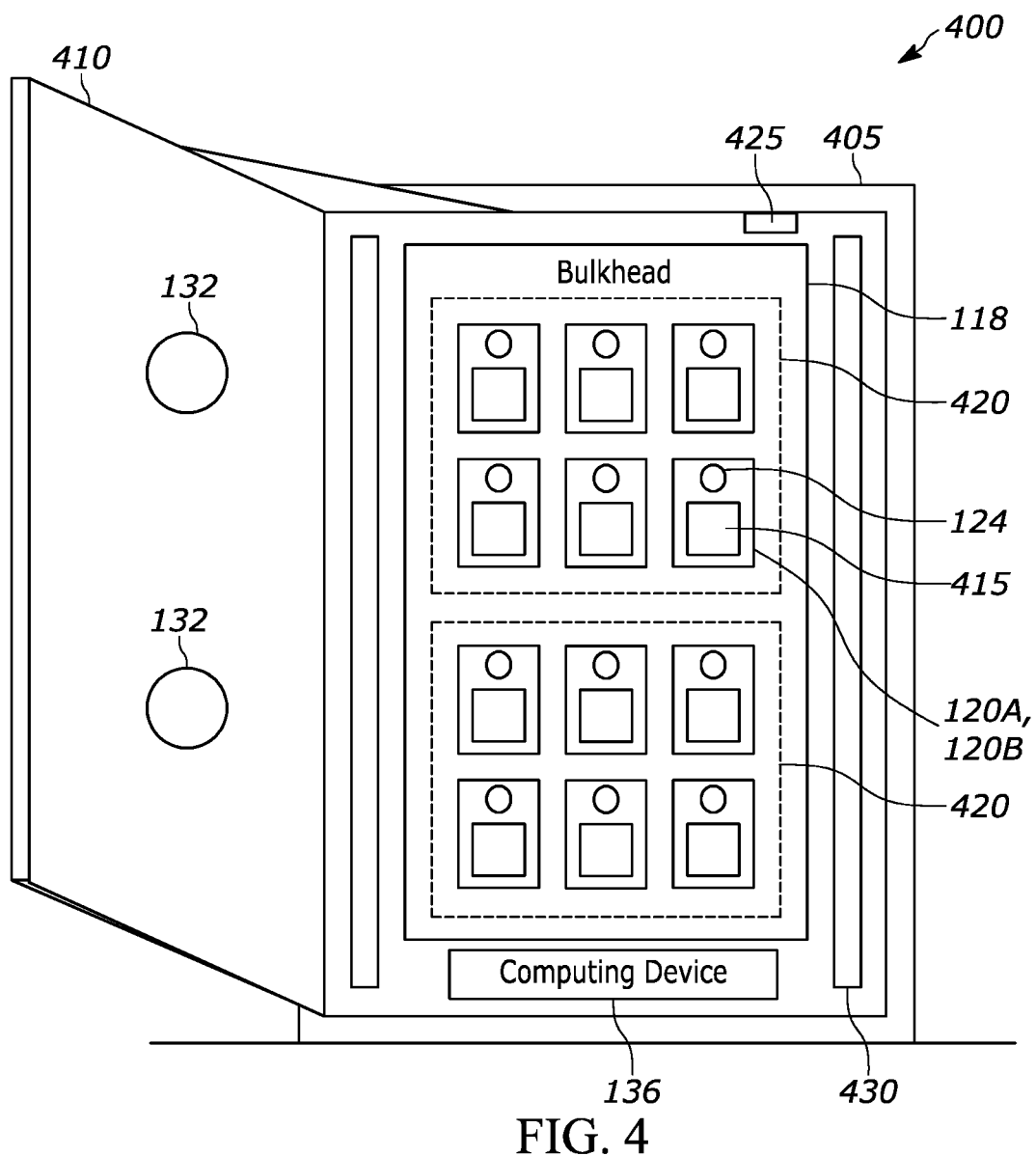
FIG. 4 is a schematic diagram of an example fiber distribution hub (FDH) that may be used to implement the example FDH of FIG. 1.

FIG. 4 is a diagram of an example FDH 400 that may be used to implement the example FDH 116 of FIG. 1. The example FDH 400 includes a cabinet 405 that may be mounted to, for example, a concrete pad. The FDH 400 includes a door 410 for selectively opening and closing the FDH 400. The door 410 may include a lock for securing the FDH 400 from tampering by unauthorized persons.

As shown, the example FDH 400 includes the example bulkhead 118 of FIG. 1 including the plurality of passive optical couplers 120A, 1206 each having a respective passive optical activity indicator 124. As described above, the passive optical couplers 120A, 1206 are mounted front-to-back to a face of the bulkhead 118 such that a port 415 of each passive optical coupler 120A, 120B (e.g., the example port 210 of FIGS. 2A-2E) is exposed frontward from the bulkhead 118 to receive a distribution optical fiber.

The example FDH 400 includes the example computing device 136 of FIG. 1 and one or more image sensors 132. In the example of FIG. 4, the image sensor(s) 132 are mounted to the door 410 of the FDH 400 such that, when the door 410 is closed, fields of view 420 of the image sensors 132 include one or more of the passive optical activity indicators 124, as shown. In general, the number of image sensors 132 depends on the dimensions of the FDH 410, and the dimensions of the fields of view 420 of the image sensor(s) 132. In some examples, the fields of view 420 overlap to accommodate the routing of optical fibers in front of the passive optical couplers 120A, 1206 that may sometimes block a view of a particular passive optical activity indicator 140 by a particular image sensor 132.

To detect whether the door 410 of the FDH 400 is closed, the example FDH 400 may include a relay 425 configured to trip, for example, when the door 410 is closed. In such examples, the computing device 136 may, responsive to the relay 425, cause the image sensors 132 to capture one or more images of the passive optical activity indicators 124 of the bulkhead 118, and store the captured images for subsequent conveyance to another computing device such as the server 130.

As shown, the FDH 400 may include any number and/or type(s) of cable rails 430 for managing the orderly routing of optical fibers within the cabinet 405.

Example Method of Verifying an Optical Connection

Figure 5:
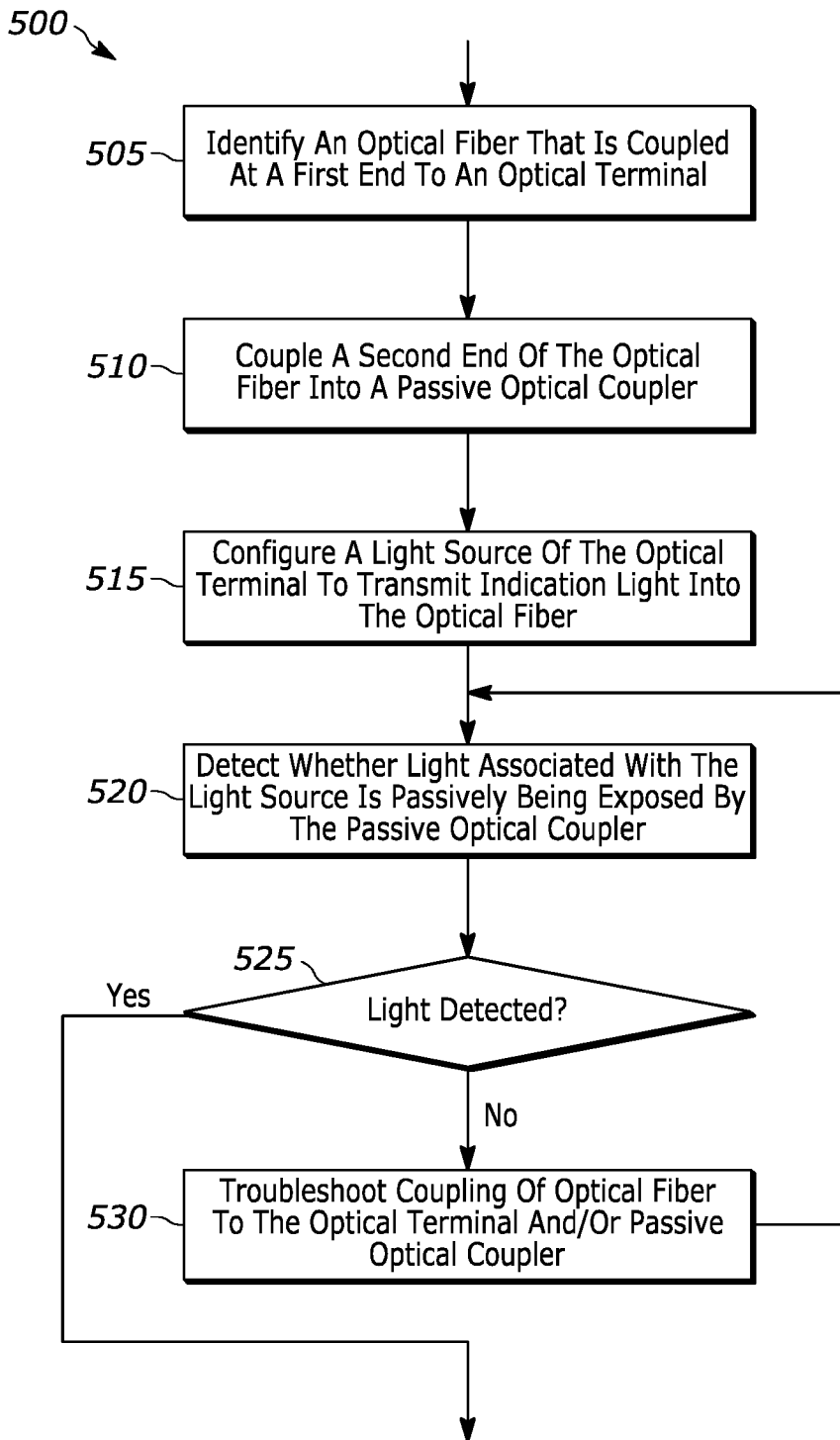
FIG. 5 is a flowchart representative of an example method for verifying an optical connection, in accordance with the disclosure.

FIG. 5 is a flowchart 500 representative of an example method for verifying the connection of an optical terminal to an FDH (e.g., one of the example FDHs 116, 400). The example method of FIG. 5 may be carried out by, for example, a service technician during the connection of an optical terminal to an FDH.

The example flowchart 500 begins with the identification of an optical fiber connected at a first end to an optical terminal (e.g., one of the ONTs 106A, 106B) (block 505), and the coupling of what is believed to be a second end of the optical fiber to a passive optical coupler in an FDH (block 510). A light source of the optical terminal is configured to transmit indication light into the optical fiber, for example, according to a prescribed pattern (block 515). Light is detected (e.g., visually, using a light meter, etc.) at the passive optical activity indicator of the passive optical coupler (block 520). If indication light is detected (block 525), the coupling of the optical terminal to the passive optical coupler is confirmed and control exits from the example flowchart 500.

If indication light is not detected (block 525), troubleshooting of the coupling of the optical terminal to the passive optical coupler may be performed (block 530), and control may return to block 520 to detect light.

Example Method of Provisioning an Optical Connection

Figure 6:
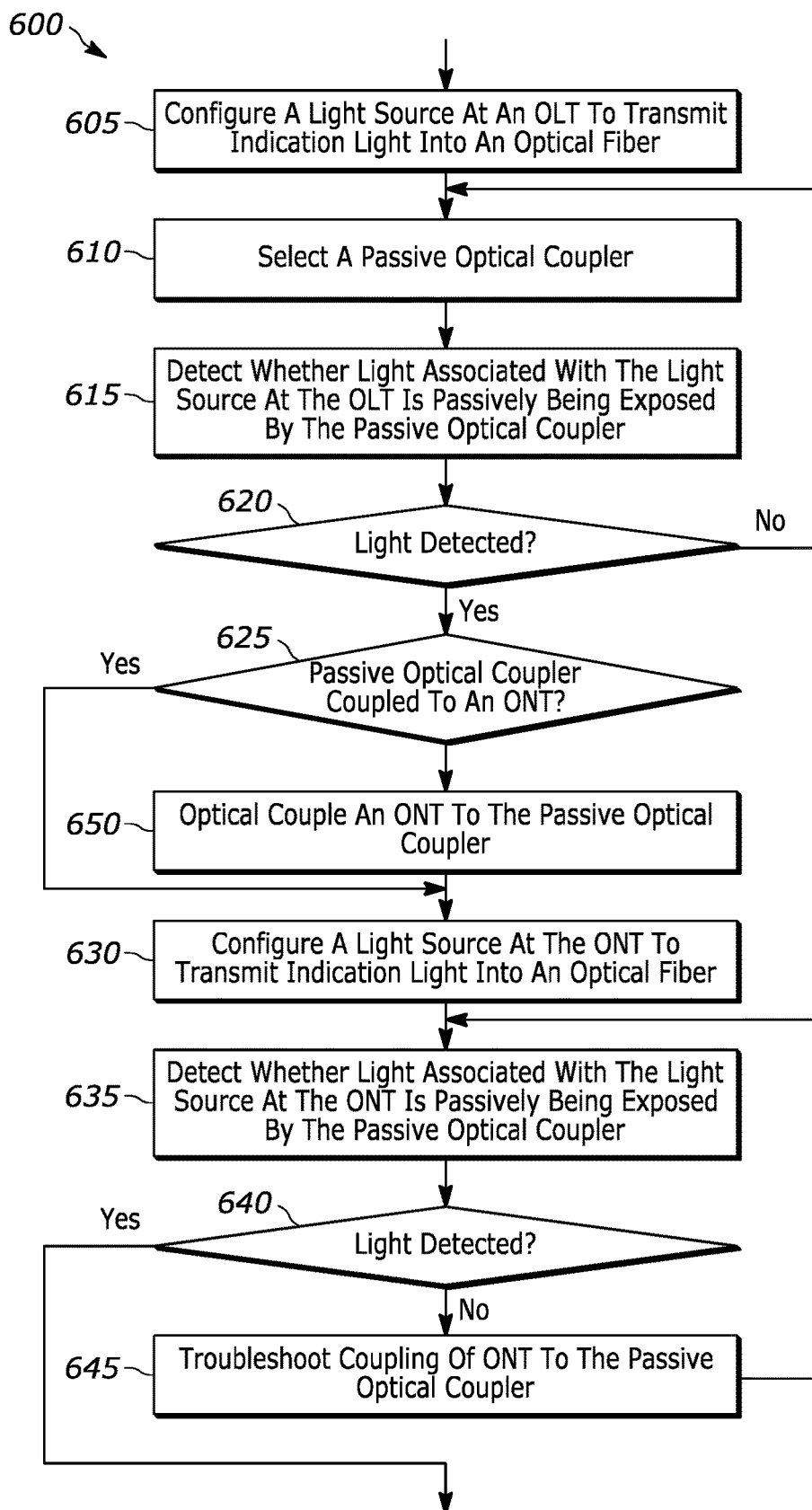
FIG. 6 is a flowchart representative of an example method for configuring an optical connection, in accordance with the disclosure.

FIG. 6 is a flowchart 600 representative of an example method for provisioning an ONT to an FDH (e.g., one of the example FDHs 116, 400). The example method of FIG. 6 may be carried out by, for example, a service technician during the provisioning and/or repair of a service for a customer.

The example flowchart 600 begins with configuring a light source at an OLT to transmit indication light into an optical fiber, for example, according to a prescribed pattern (block 605). A first passive optical coupler is selected or identified (e.g., based on a grid map of the FDH to determine to which passive optical coupler a customer is supposedly connected to and/or is supposed to be connected to) (block 610). Light is detected (e.g., visually, using a light meter, etc.) at the passive optical activity indicator of the passive optical coupler (block 615). If indication light is detected (block 620), the coupling of the OLT to the passive optical coupler is confirmed. If indication light is not detected (block 620), then control returns to block 610 to identify another passive optical coupler (block 610). The process of blocks 610-620 may be repeated until a passive optical coupler actively coupled to the OLT is identified.

If the passive optical coupler is (supposedly) connected to the customer's ONT (e.g., based on a distribution optical fiber being connected to the passive optical coupler) (block 625), a light source at the customer's ONT is configured to transmit indication light into an optical fiber, for example, according to a prescribed pattern (block 630). Light is detected (e.g., visually, using a light meter, etc.) at the passive optical activity indicator of the passive optical coupler (block 635). If indication light is detected (block 640), the coupling of the OLT to the customer's ONT via the passive optical coupler is confirmed, and control exits from the example flowchart 500.

If indication light is not detected (block 640), troubleshooting of the coupling of the customer's ONT to the passive optical coupler may be performed (block 645) and control may return to block 635 to detect light.

Returning to block 625, if the passive optical coupler is not connected to the customer's ONT (e.g., based on a distribution optical fiber not being connected to the passive optical coupler) (block 625), then a distribution optical fiber (supposedly) associated with the customer's ONT is identified and coupled to the passive optical coupler (block 650), and control proceeds to block 630 to verify the connection.

Example Method of Identifying an Optical Connection

Figure 7:
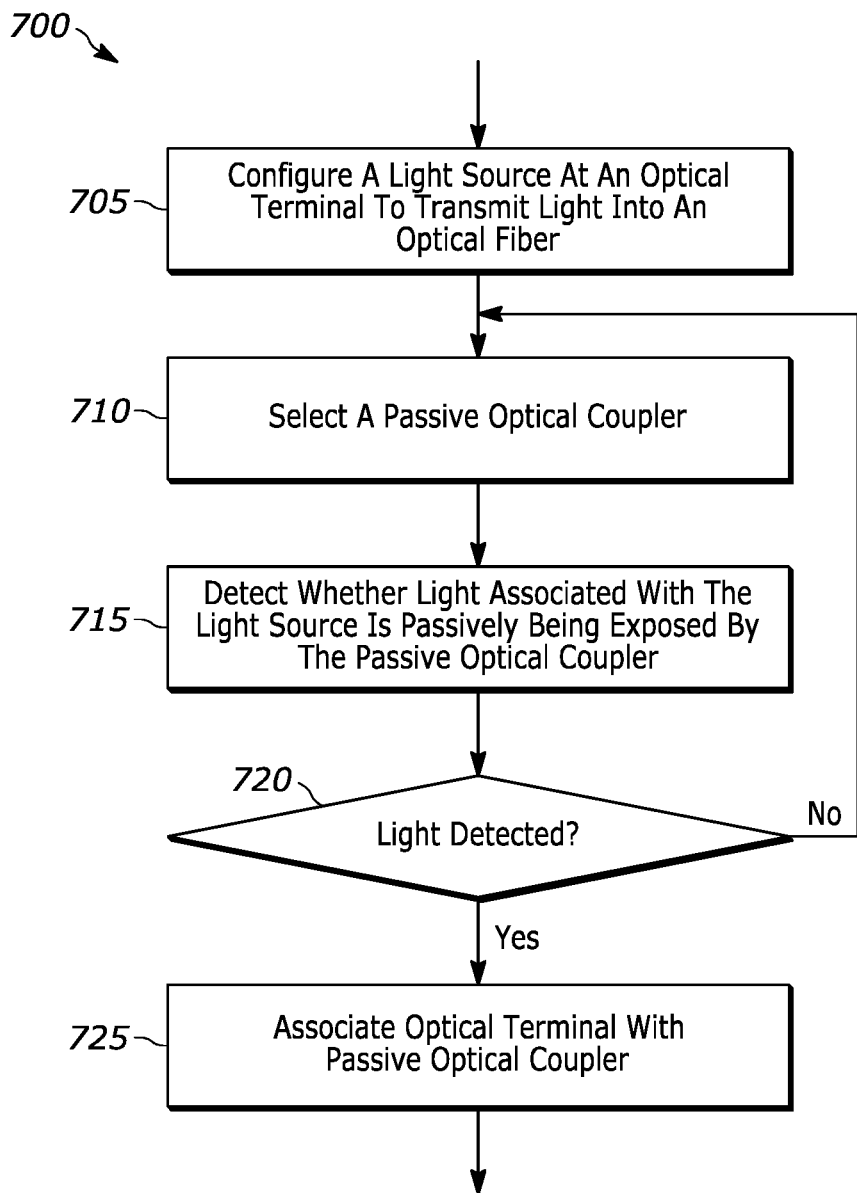
FIG. 7 is a flowchart representative of an example method for identifying an optical connection, in accordance with the disclosure.

FIG. 7 is a flowchart 700 representative of an example method for identifying a passive optical coupler coupled to an optical terminal. The example method of FIG. 7 may be carried out by, for example, a service technician during the provisioning and/or repair of a service for a customer. Additionally and/or alternatively, the method of FIG. 7 may be performed by a computing device to automatically identify associations of optical terminals and passive optical couplers.

The example flowchart 700 begins with a light source at an optical terminal being configured to transmit indication light into an optical fiber, for example, according to a prescribed pattern (block 705). A first passive optical coupler is selected or identified (e.g., based on a grid map of the FDH to determine to which optical terminal is supposedly connected to and/or is supposed to be connected to) (block 710). Light is detected (e.g., visually, using a light meter, etc.) at the passive optical activity indicator of the passive optical coupler (block 715). If indication light is detected (block 720), the coupling of the optical terminal to the passive optical coupler is confirmed and the optical terminal may be associated with the passive optical coupler in, for example, the example electronic grid map 138 of FIG. 1.

If indication light is not detected (block 720), control returns to block 710 to identify another passive optical coupler.

Example Method of Mapping Optical Connections of an FDH

Figure 8:
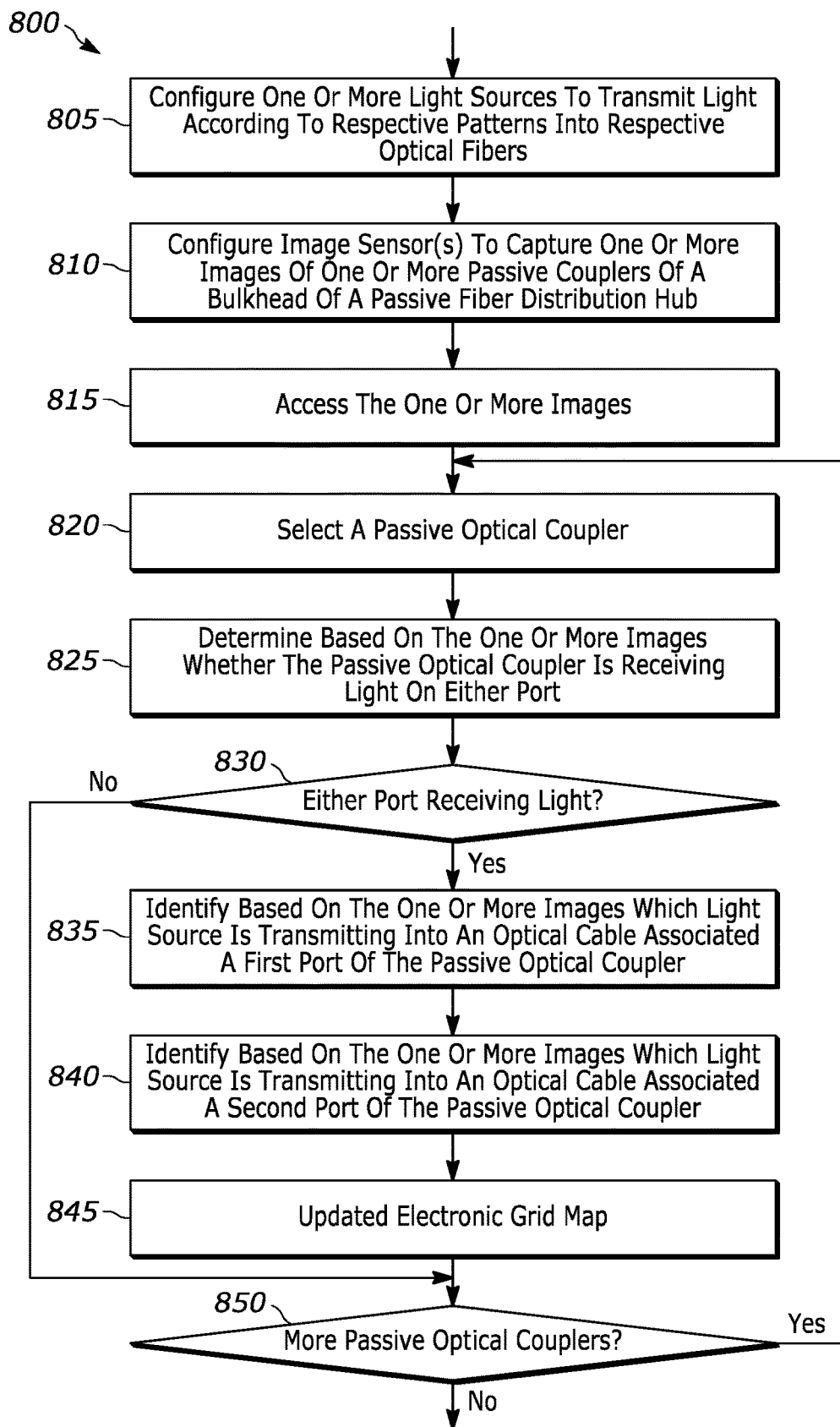
FIG. 8 is a flowchart representative of an example method for mapping optical connections of an FDH, in accordance with the disclosure.

FIG. 8 is a flowchart 800 representative of an example method for automatically mapping optical connections in an FDH (e.g., one of the FDHs 116, 400). The method of FIG. 8 may be performed by a computing device such as the example server 130.

The example flowchart 800 begins with a computing device configuring light sources associated with one or more optical terminals to transmit indication light into respective optical fibers according to respective patterns (block 805). At block 810, one or more image sensors of the FDH are configured to capture one or more images of a bulkhead of the FDH (block 810).

The one or more images are accessed (block 815). For example, the FDH can communicate the images to the computing device via a network.

A passive optical coupler is selected (block 820), and one or more of the captured images that include the selected passive optical coupler are processed to determine whether any light is being exposed by the passive optical activity indicator of the selected passive optical coupler (block 825). If light is detected (block 830), then the computing device processes the one or more of the captured images that include the selected passive optical coupler to identify a first light source of a first optical terminal that is transmitting light according to a detected pattern of light (block 835), and identify a second light source of a second optical terminal that is transmitting light according to a detected pattern of light (block 840). The computing device updates an electronic grid map of the FDH to associate the first and second optical terminals with the passive optical coupler (block 845).

If there are more passive optical couplers to process (block 850), control returns to block 820 to select a next passive optical coupler.

Returning to block 830, if no indication light is detected (block 830), control proceeds to block 850 to determine if there are more passive optical couplers to process.

Example Processing Platform

Figure 9:
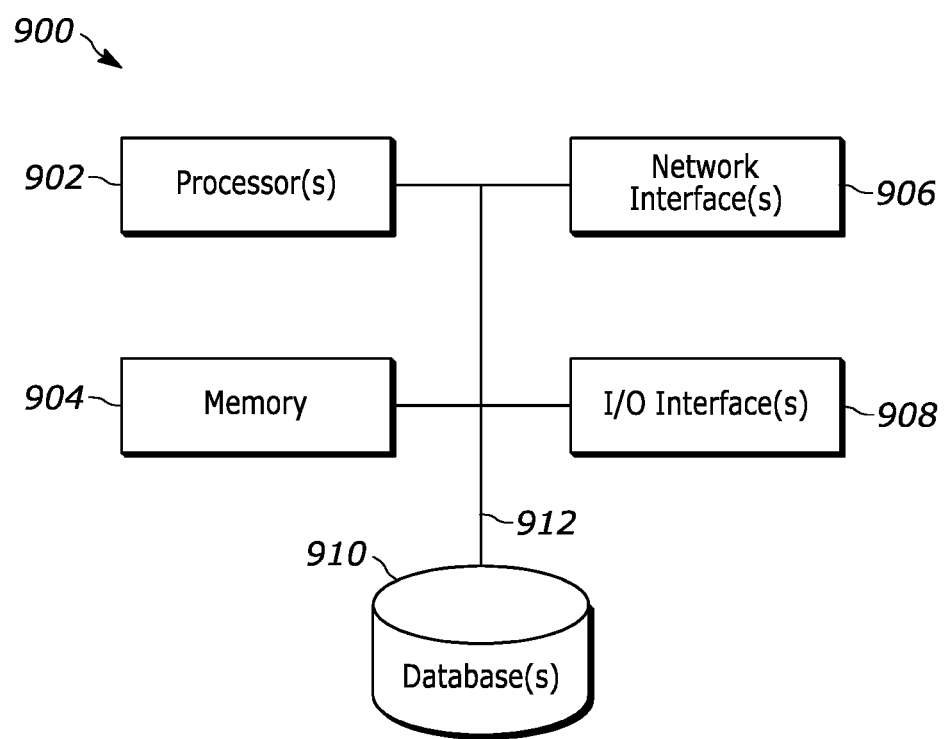
FIG. 9 is a block diagram of an example computing system that may be used to implement the various structures and methods for verifying optical connections, configuring optical connections, identifying optical connections and/or mapping connections of an FDH, in accordance with the disclosure.

FIG. 9 is a block diagram representative of an example logic circuit capable of implementing, for example, one or more components of the example server 130, an optical terminal (e.g., any of the OLT 102, the ONTs 106A, 106B and/or the optical terminal 300), and/or the example computing system 136. The example logic circuit of FIG. 9 is a processing platform 900 capable of executing instructions to, for example, implement operations of the example methods described herein, as may be represented by the flowcharts of the drawings that accompany this description. Other example logic circuits capable of, for example, implementing operations of the example methods described herein include a field programmable gate array (FPGA), an application specific integrated circuit (ASIC), a programmable logic device (PLD), and a field programmable logic device (FPLD). The processing platform 900 may be, for example, a server, a computer, a workstation, a laptop, a mobile device (e.g., a cell phone, a smart phone, a tablet such as an IPAD™), or any other type of computing device or system.

The example processing platform 900 of FIG. 9 includes one or more processors 902, memory 904, one or more network interfaces 906, one or more input/output (I/O) interfaces 908, and/or one or more databases 910, all of which are interconnected via an address/data bus 912.

The processor 902 of the illustrated example is hardware, and may be a semiconductor based (e.g., silicon based) device. The processor 902 may be, for example, one or more programmable microprocessors, controllers, digital signal processors (DSP), graphics processing units (GPU) and/or any suitable type of programmable processor capable of executing instructions to, for example, implement operations of the example methods described herein. Additionally and/or alternatively, the processor 902 may be a field programmable gate array (FPGA), an application specific integrated circuit (ASIC), etc. that implements operations of the example methods described herein without executing instructions.

The memory 904 is accessible by the processor 902 (e.g., via a memory controller). The example processor 902 interacts with the memory 904 to obtain, for example, machine-readable instructions stored in the memory 904 corresponding to, for example, the operations represented by the flowcharts of this disclosure. The example processor 902 may also interact with the memory 904 to store data, such as data formed or used during execution of machine-readable instructions. Example memory 904 includes any number and/or type(s) of volatile or non-volatile, non-transitory, machine-readable storage medium, devices or disks, such as a semiconductor memory, magnetically readable memory, optically readable memory, a hard disk drive (HDD), a solid-state drive (SSD), a read-only memory (ROM), a random-access memory (RAM), a redundant array of independent disks (RAID) system, a cache, flash memory, or any other storage medium, device or disk in which information may be stored for any duration (e.g., permanently, for an extended time period, for a brief instance, for temporarily buffering, for caching of the information, etc.). Additionally and/or alternatively, machine-readable instructions corresponding to the example operations described herein may be stored on one or more volatile or non-volatile, non-transitory, machine-readable removable storage media (e.g., a compact disc (CD), digital versatile disk (DVD), Blu-ray disk, removable flash memory, etc.) that may be coupled to the processing platform 900 to provide access to the machine-readable instructions stored thereon.

The example processing platform 900 of FIG. 9 includes one or more communication interfaces such as, for example, the one or more network interfaces 906, and/or the one or more input/output (I/O) interfaces 908. The communication interface(s) enable the processing platform 900 of FIG. 9 to communicate with, for example, another device, system, etc. (e.g., the OLT 102, the ONTs 106A, 106B, the computing device 136, the sever 130, the computing device 126, etc.), datastore, database, and/or any other machine.

The example processing platform 900 of FIG. 9 includes the network interface(s) 906 to enable communication with other machines (e.g., the OLT 102, the ONTs 106A, 106B, the computing device 136, the sever 130, the computing device 126, etc.) via, for example, one or more networks such as the PON 101 and/or the network 128. The example network interface(s) 906 may be used to implement the example interface transceiver(s) 305. The example network interface 906 includes any suitable type of communication interface(s) (e.g., wired and/or wireless interfaces) configured to operate in accordance with any suitable communication protocol(s). Example network interfaces 906 include a TCP/IP interface, a WiFi™ transceiver (e.g., according to the IEEE 802.11x family of standards), an Ethernet transceiver, a cellular transceiver, a satellite transceiver, an asynchronous transfer mode (ATM) transceiver, a digital subscriber line (DSL) modem, a coaxial cable modem, a dialup modem, or any other suitable interface based on any other suitable communication protocols or standards.

The example, processing platform 900 of FIG. 9 includes the input/output (I/O) interface(s) 908 (e.g., a Bluetooth® interface, a near-field communication (NFC) interface, a universal serial bus (USB) interface, a serial interface, an infrared interface, a PCI express interface, etc.) to enable the processor 902 to communicate with peripheral I/O devices and/or other communication systems. For example, the I/O interface(s) 908 may be used to control and receive image data from the image sensor(s) 132, control a light source 325, enable receipt of user input (e.g., from a touch screen, a keyboard, a navigation device such as mouse, touch pad, joystick or trackball, a microphone, a button, etc.) and communication of output data (e.g., visual indicators, instructions, data, images, etc.) to the user (e.g., via a display, a speaker, a printer, a communication interface, an antenna, etc.). The I/O interface(s) 908 typically include a graphics driver card, graphics driver chip and/or graphics driver processor to drive a display when a display is present.

In some examples, the processing platform 900 also includes, or is otherwise communicatively coupled to, a database 910 or other data storage mechanism (one or more of a HDD, optical storage drive, solid state storage device, CD, CD-ROM, DVD, Blu-ray disk, RAID, etc.). In the illustrated example, the database 910 may store the example electronic grid map 138.

Additional Considerations

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific examples have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of the disclosure. Additionally, the described examples should not be interpreted as mutually exclusive, and should instead be understood as potentially combinable if such combinations are permissive in any way. In other words, any feature disclosed in any of the aforementioned examples may be included in any of the other aforementioned examples.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting example the term is defined to be within 10%, in another example within 5%, in another example within 1% and in another example within 0.5%. The term "coupled" as used herein is defined as connected, although not necessarily directly and not necessarily mechanically. A device or structure that is "configured" in a certain way is configured in at least that way, but may also be configured in ways that are not listed.

Further, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, inventive subject matter may lie in less than all features of a single disclosed example. Thus, the following claims are hereby incorporated into the Detailed Description, with each claim standing on its own as a separately claimed subject matter.

Use of "a" or "an" are employed to describe elements and components of the examples herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way, but may also be configured in ways that are not listed.

Further, as used herein, the expressions "in communication," "coupled" and "connected," including variations thereof, encompasses direct communication and/or indirect communication through one or more intermediary components, and does not require direct mechanical or physical (e.g., wired) communication and/or constant communication, but rather additionally includes selective communication at periodic intervals, scheduled intervals, aperiodic intervals, and/or one-time events. The examples are not limited in this context.

Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

Moreover, in the foregoing specification and the attached drawings, specific examples have been described. However, one of ordinary skill in the art appreciates that various modifications and changes can be made in view of aspects of this disclosure without departing from the scope of the disclosure as set forth in the claims below. Accordingly, the specification and figures are to be regarded in an illustrative rather than a restrictive sense, and all such modifications made in view of aspects of this disclosure are intended to be included within the scope of present teachings. Numerous alternative examples could be implemented, using either current technology or technology developed after the filing date of this patent, which would still fall within the scope of the claims. By way of example, and not limitation, the disclosure herein contemplates at least the following examples:

1. A system, comprising:
   a fiber distribution hub (FDH) of a passive optical network (PON), the FDH including:
   a bulkhead having a plurality of passive optical couplers, each of the plurality of passive optical couplers having:
   a respective first port adapted to receive an end of a respective first optical fiber,
   a respective second port adapted to receive an end of a respective second optical fiber, and
   a respective passive optical activity indicator configured to expose (i) a portion of first light propagating in the respective first optical fiber when the first optical fiber is received in the first port, and (ii) a portion of second light propagating in the respective second optical fiber when the second optical fiber is received in the second port, and
   an image sensor configured to capture one or more images of the respective passive optical activity indicators of the plurality of passive optical couplers; and
   a computing device configured to, based on the one or more images, determine which of the plurality of passive optical couplers are receiving a first optical signal at their respective first port and/or receiving a second optical signal at their respective second port.

2. The system of example 1, wherein the computing device is further configured to determine one or more entries of an electronic grid map for the FDH based upon the determination of which of the plurality of passive optical couplers are receiving a first optical signal at their respective first port and/or receiving a second optical signal at their respective second port.

3. The system of example 1, wherein the computing device is configured to:
   configure a plurality of light sources of a plurality of respective optical terminals to transmit light according to a plurality of respective patterns; and
   determine, based on the one or more images, connections of the plurality of optical terminals to ports of the plurality of passive optical couplers based on which respective passive optical activity indicators are illuminated according to which respective patterns.

4. The system of example 3, wherein configuring a first light source of the plurality of light sources includes configuring the first light source to encode a unique identifier in the transmitted light.

5. The system of example 3, wherein configuring a first light source of the plurality of light sources includes configuring the first light source to multiplex first light having a first wavelength associated with providing a communication service with second light having a different second wavelength associated with providing an activity indication.

6. The system of example 4, wherein the image sensor is configured to sense light at the second wavelength and to filter out light at the first wavelength.

7. The system of example 3, wherein the image sensor is configured to capture the one or more images at a frame rate that exceeds a pre-determined rate of change of the respective patterns.

8. The system of example 1, wherein the computing device is further configured to, for a first passive optical coupler of the plurality of passive optical couplers:

configure a first light source to transmit light according to a first pattern;

configure a second light source to transmit light according to a second pattern different from the first pattern; and distinguish, based upon the one or more images, between (i) only the first light source is transmitting into the respective first optical fiber of the first optical coupler, (ii) only the second light source is transmitting into the respective second optical fiber of the first optical coupler, and (iii) both of the first light source and the second light source are transmitting into their respective optical fiber of the first optical coupler.

9. The system of example 1, wherein the FDH further includes a door, and a relay configured to detect whether the door is closed, and wherein the computing device is further configured to, in response to the relay detecting the door is closed:

cause the image sensor to capture the one or more images; and determine, based on the one or more images, which of the plurality of passive optical couplers are receiving a first optical signal at their respective first port and/or a second optical signal at their respective second port.

10. The system of example 1, wherein the FDH further includes a communication device configured to communicate the one or more images to the computing device.

11. A method, comprising:

accessing one or more digital images of a bulkhead of a fiber distribution hub (FDH) of a passive optical network (PON), the one or more images depicting a plurality of passive optical activity indicators of respective ones of a plurality of passive optical couplers of the bulkhead, each of the plurality of passive optical couplers having a respective first port adapted to receive an end of a respective first optical fiber, a respective second port adapted to receive an end of a respective second optical fiber, and a respective passive optical activity indicator constructed of a passive light transmissive material that passively exposes (i) a portion of first light propagating in the respective first optical fiber when the first optical fiber is received at the first port, and (ii) a portion of second light propagating in the respective second optical fiber when the second optical fiber is received at the second port; and determining, based upon the one or more images, which of the plurality of passive optical couplers are receiving a first optical signal at their respective first port and/or receiving a second optical signal at their respective second port.

12. The method of example 11, further comprising determining one or more entries of an electronic grid map of the FDH based upon the determination of which of the plurality of passive optical couplers are receiving a first optical signal at their respective first port and/or receiving a second optical signal at their respective second port.

13. The method of example 11, further comprising:

configuring a plurality of light sources for respective ones of a plurality of optical terminals to transmit light according to a plurality of respective patterns; and determining, based on the one or more images, connections of the plurality of optical terminals to ports of the plurality of passive optical couplers based on which respective passive optical activity indicators are illuminated according to which respective patterns.

14. The method of example 11, further comprising receiving the one or more images from the FDH, wherein the one or more images are captured at a frame rate that exceeds a pre-determined rate of change of the respective patterns 15. The method of example 11, wherein configuring a first light source of the plurality of light sources includes configuring the first light source to multiplex first light having a first wavelength associated with providing a communication service with second light having a different second wavelength associated with providing an activity indication.

16. A non-transitory, computer-readable storage medium storing instructions that, when executed by one or more processors, cause a system to:

access one or more images of a bulkhead of a fiber distribution hub (FDH) of a passive optical network (PON), the one or more images depicting a plurality of passive optical activity indicators of respective ones of a plurality of passive optical couplers of the bulkhead, each of the plurality of passive optical couplers having a respective first port adapted to receive an end of a respective first optical fiber, a respective second port adapted to receive an end of a respective second optical fiber, and a respective passive optical activity indicator constructed of a passive light transmissive material that passively exposes (i) a portion of first light propagating in the respective first optical fiber when the first optical fiber is received at the first port, and (ii) a portion of second light propagating in the respective second optical fiber when the second optical fiber is received at the second port; and determine, based upon the one or more images, which of the plurality of passive optical couplers are receiving a first optical signal at their respective first port and/or receiving a second optical signal at their respective second port.

17. The storage medium of example 16, wherein the instructions, when executed by the one or more processors, cause the system to determine one or more entries of an electronic grid map of the FDH based upon the determination of which of the plurality of passive optical couplers are receiving a first optical signal at their respective first port and/or receiving a second optical signal at their respective second port.

18. The storage medium of example 16, wherein the instructions, when executed by the one or more processors, cause the system to:

configure a plurality of light sources of respective ones of a plurality of optical terminals to transmit light according to a plurality of respective patterns; and determine, based on the one or more images, connections of the plurality of optical terminals to ports of the plurality of passive optical couplers based on which respective passive optical activity indicators are illuminated according to which respective patterns.

19. The storage medium of example 16, wherein the one or more images are captured at a frame rate that exceeds a pre-determined rate of change of the respective patterns 20. The storage medium of example 16, wherein the instructions, when executed by the one or more processors, cause the system to configure a first light source of the plurality of light sources by configuring the first light source to multiplex first light having a first wavelength associated with providing a communication service with second light having a different second wavelength associated with an activity indication.

Additionally, the benefits, advantages, solutions to problems, and any element(s) that may cause any benefit, advantage, or solution to occur or become more pronounced are not to be construed as a critical, required, or essential features or elements of any or all the claims.

Finally, any references, including, but not limited to, publications, patent applications, and patents cited herein are hereby incorporated in their entirety by reference to the same extent as if each reference were individually and specifically indicated to be incorporated by reference and were set forth in its entirety herein.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system, comprising:
   a fiber distribution hub (FDH) of a passive optical network (PON), the FDH including:
   a bulkhead having a plurality of passive optical couplers, each of the plurality of passive optical couplers having:
   a respective first port adapted to receive an end of a respective first optical fiber,
   a respective second port adapted to receive an end of a respective second optical fiber, and
   a respective passive optical activity indicator configured to expose (i) a portion of first light propagating in the respective first optical fiber when the first optical fiber is received in the first port, and (ii) a portion of second light propagating in the respective second optical fiber when the second optical fiber is received in the second port, and
   an image sensor configured to capture one or more images of the respective passive optical activity indicators of the plurality of passive optical couplers; and
   a computing device configured to:
   configure a plurality of light sources of a plurality of respective optical terminals to transmit light according to a plurality of respective patterns,
   determine, based on the one or more images, which of the plurality of passive optical couplers are receiving a first optical signal at their respective first port and/or receiving a second optical signal at their respective second port, and
   determine, based on the one or more images, connections of the plurality of optical terminals to ports of the plurality of passive optical couplers based on which respective passive optical activity indicators are illuminated according to which respective patterns.

2. The system of claim 1, wherein the computing device is further configured to determine one or more entries of an electronic grid map for the FDH based upon the determination of which of the plurality of passive optical couplers are receiving a first optical signal at their respective first port and/or receiving a second optical signal at their respective second port.

3. The system of claim 1, wherein configuring a first light source of the plurality of light sources includes configuring the first light source to encode a unique identifier in the transmitted light.

4. The system of claim 1, wherein configuring a first light source of the plurality of light sources includes configuring the first light source to multiplex first light having a first wavelength associated with providing a communication service with second light having a different second wavelength associated with providing an activity indication.

5. The system of claim 4, wherein the image sensor is configured to sense light at the second wavelength and to filter out light at the first wavelength.

6. The system of claim 1, wherein the image sensor is configured to capture the one or more images at a frame rate that exceeds a pre-determined rate of change of the respective patterns.

7. A system, comprising:
   a fiber distribution hub (FDH) of a passive optical network (PON), the FDH including:
   a bulkhead having a plurality of passive optical couplers, each of the plurality of passive optical couplers having:
   a respective first port adapted to receive an end of a respective first optical fiber,
   a respective second port adapted to receive an end of a respective second optical fiber, and
   a respective passive optical activity indicator configured to expose (i) a portion of first light propagating in the respective first optical fiber when the first optical fiber is received in the first port, and (ii) a portion of second light propagating in the respective second optical fiber when the second optical fiber is received in the second port, and
   an image sensor configured to capture one or more images of the respective passive optical activity indicators of the plurality of passive optical couplers; and
   a computing device configured to:
   determine, based on the one or more images, determine which of the plurality of passive optical couplers are receiving a first optical signal at their respective first port and/or receiving a second optical signal at their respective second port, and
   for a first passive optical coupler of the plurality of passive optical couplers:
   configure a first light source to transmit light according to a first pattern,
   configure a second light source to transmit light according to a second pattern different from the first pattern, and
   distinguish, based upon the one or more images, between (i) only the first light source is transmitting into the respective first optical fiber of the first optical coupler, (ii) only the second light source is transmitting into the respective second optical fiber of the first optical coupler, and (iii) both of the first light source and the second light source are transmitting into their respective optical fiber of the first optical coupler.

8. The system of claim 1, wherein the FDH further includes a door, and a relay configured to detect whether the door is closed, and wherein the computing device is further configured to, in response to the relay detecting the door is closed:
    cause the image sensor to capture the one or more images; and
    determine, based on the one or more images, which of the plurality of passive optical couplers are receiving a first optical signal at their respective first port and/or a second optical signal at their respective second port.

9. The system of claim 1, wherein the FDH further includes a communication device configured to communicate the one or more images to the computing device.

10. A method, comprising:
    accessing one or more digital images of a bulkhead of a fiber distribution hub (FDH) of a passive optical network (PON), the one or more images depicting a plurality of passive optical activity indicators of respective ones of a plurality of passive optical couplers of the bulkhead, each of the plurality of passive optical couplers having a respective first port adapted to receive an end of a respective first optical fiber, a respective second port adapted to receive an end of a respective second optical fiber, and a respective passive optical activity indicator constructed of a passive light transmissive material that passively exposes (i) a portion of first light propagating in the respective first optical fiber when the first optical fiber is received at the first port, and (ii) a portion of second light propagating in the respective second optical fiber when the second optical fiber is received at the second port;
    determining, based upon the one or more images, which of the plurality of passive optical couplers are receiving a first optical signal at their respective first port and/or receiving a second optical signal at their respective second port;
    configuring a plurality of light sources for respective ones of a plurality of optical terminals to transmit light according to a plurality of respective patterns; and
    determining, based on the one or more images, connections of the plurality of optical terminals to ports of the plurality of passive optical couplers based on which respective passive optical activity indicators are illuminated according to which respective patterns.

11. The method of claim 10, further comprising determining one or more entries of an electronic grid map of the FDH based upon the determination of which of the plurality of passive optical couplers are receiving a first optical signal at their respective first port and/or receiving a second optical signal at their respective second port.

12. The method of claim 10, further comprising receiving the one or more images from the FDH, wherein the one or more images are captured at a frame rate that exceeds a pre-determined rate of change of the respective patterns.

13. The method of claim 10, wherein configuring a first light source of the plurality of light sources includes configuring the first light source to multiplex first light having a first wavelength associated with providing a communication service with second light having a different second wavelength associated with providing an activity indication.

14. A non-transitory, computer-readable storage medium storing instructions that, when executed by one or more processors, cause a system to:
    access one or more images of a bulkhead of a fiber distribution hub (FDH) of a passive optical network (PON), the one or more images depicting a plurality of passive optical activity indicators of respective ones of a plurality of passive optical couplers of the bulkhead, each of the plurality of passive optical couplers having a respective first port adapted to receive an end of a respective first optical fiber, a respective second port adapted to receive an end of a respective second optical fiber, and a respective passive optical activity indicator constructed of a passive light transmissive material that passively exposes (i) a portion of first light propagating in the respective first optical fiber when the first optical fiber is received at the first port, and (ii) a portion of second light propagating in the respective second optical fiber when the second optical fiber is received at the second port; and
    determine, based upon the one or more images, which of the plurality of passive optical couplers are receiving a first optical signal at their respective first port and/or receiving a second optical signal at their respective second port,
    configure a plurality of light sources of respective ones of a plurality of optical terminals to transmit light according to a plurality of respective patterns; and
    determine, based on the one or more images, connections of the plurality of optical terminals to ports of the plurality of passive optical couplers based on which respective passive optical activity indicators are illuminated according to which respective patterns.

15. The storage medium of claim 14, wherein the instructions, when executed by the one or more processors, cause the system to determine one or more entries of an electronic grid map of the FDH based upon the determination of which of the plurality of passive optical couplers are receiving a first optical signal at their respective first port and/or receiving a second optical signal at their respective second port.

16. The storage medium of claim 14, wherein the one or more images are captured at a frame rate that exceeds a pre-determined rate of change of the respective patterns.

17. The storage medium of claim 14, wherein the instructions, when executed by the one or more processors, cause the system to configure a first light source of the plurality of light sources by configuring the first light source to multiplex first light having a first wavelength associated with providing a communication service with second light having a different second wavelength associated with an activity indication.

* * * * *

UNITED STATES PATENT AND TRADEMARK OFFICE
CERTIFICATE OF CORRECTION

PATENT NO. : 11,356,177 B1
APPLICATION NO. : 17/524351
DATED : June 7, 2022
INVENTOR(S) : John Valdez et al.

Page 1 of 1

It is certified that error appears in the above-identified patent and that said Letters Patent is hereby corrected as shown below:

In the Claims

At Column 22, Line 45, "images, determine" should be -- images, --.

At Column 24, Line 23, "port; and" should be -- port; --.

At Column 24, Line 28, "port," should be -- port; --.

Signed and Sealed this
Twenty-eighth Day of November, 2023

Katherine Kelly Vidal
*Director of the United States Patent and Trademark Office*